US007026618B2

(12) United States Patent
Sawada et al.

(10) Patent No.: US 7,026,618 B2
(45) Date of Patent: Apr. 11, 2006

(54) HIGHLY-SENSITIVE, PYROELECTRIC INFRARED SENSING METHOD AND APPARATUS

(75) Inventors: Kazuaki Sawada, Aichi (JP); Makoto Ishida, Aichi (JP)

(73) Assignee: Japan Science and Technology Corporation, Kawaguchi-shi (JP)

( * ) Notice: Subject to any disclaimer, the term of this patent is extended or adjusted under 35 U.S.C. 154(b) by 277 days.

(21) Appl. No.: 10/363,264

(22) PCT Filed: May 16, 2001

(86) PCT No.: PCT/JP01/04063

§ 371 (c)(1),
(2), (4) Date: Mar. 10, 2003

(65) Prior Publication Data

US 2003/0178983 A1 Sep. 25, 2003

(30) Foreign Application Priority Data

Sep. 27, 2000 (JP) ............................ 2000-293668

(51) Int. Cl.
*H01J 31/49* (2006.01)

(52) U.S. Cl. ................................ 250/338.2; 250/338.3

(58) Field of Classification Search ............ 250/338.2, 250/338.3, 338.1

See application file for complete search history.

(56) References Cited

U.S. PATENT DOCUMENTS 3,594,583 A * 7/1971 Sheldon ...................... 250/210
6,123,288 A * 9/2000 Kenyon ..................... 244/3.16

FOREIGN PATENT DOCUMENTS

| | | |
|---|---|---|
| JP | 57-109241 | 7/1982 |
| JP | 10-48042 | 2/1998 |
| JP | 2000-111424 | 4/2000 |
| JP | 2001-15011 | 1/2001 |

* cited by examiner

*Primary Examiner*—Kiet T. Nguyen
(74) *Attorney, Agent, or Firm*—Oblon, Spivak, McClelland, Maier & Neustadt, P.C.

(57) ABSTRACT

A highly-sensitive, pyroelectric infrared sensing method and apparatus that can detect infrared temperature with high sensitivity throughout the entire electromagnetic wave range including millimeter waves and radioactive rays. The super-sensitive infrared sensor is an infrared sensor of a type that emits electrons from a surface of a ferroelectric body having no emitter. Therefore, a gate electrode is not required to be provided in the vicinity of an emitter. Accordingly, since electrons are emitted directly from a PZT thin film, which serves as a ferroelectric body, in proportion to a temperature variation caused by irradiation of an infrared ray, only provision of an anode is required. Further, designation of machining conditions of the surface of the ferroelectric body is unnecessary.

14 Claims, 5 Drawing Sheets

F I G. 1
(a)
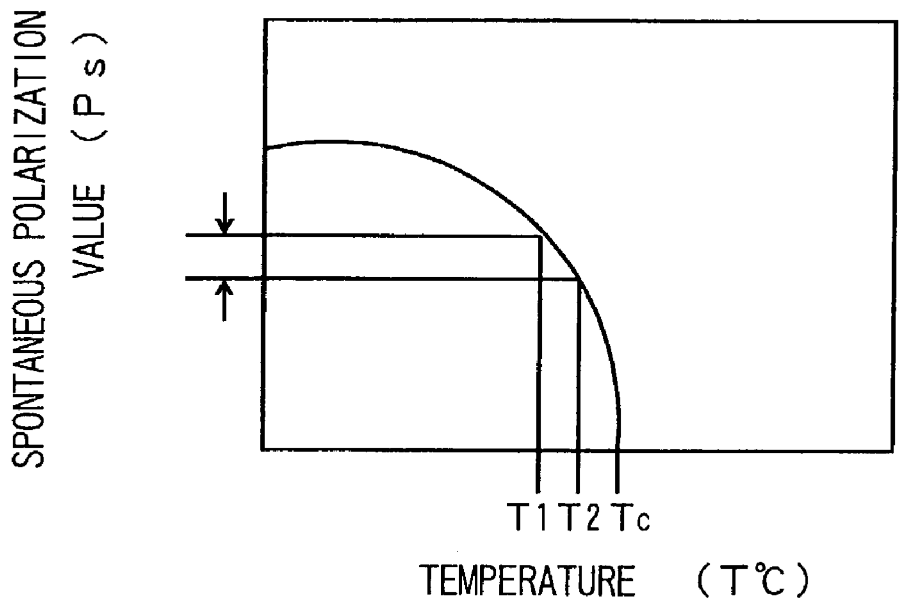
(b)
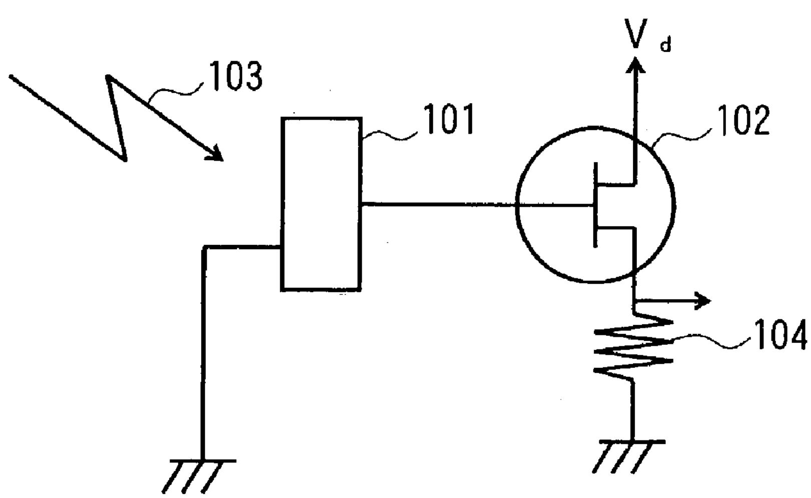

F I G. 2
(a)
(b)
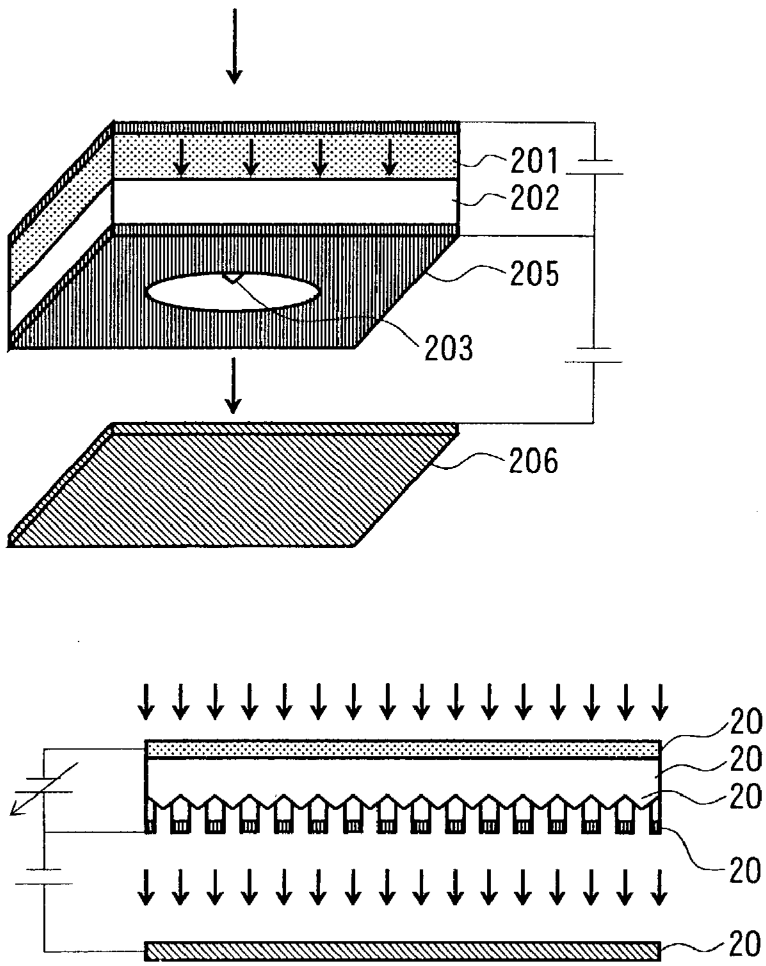
F I G. 3
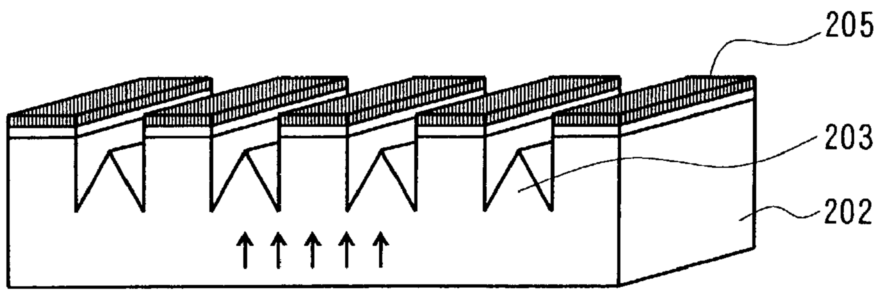

(a)

(b)

F I G. 8
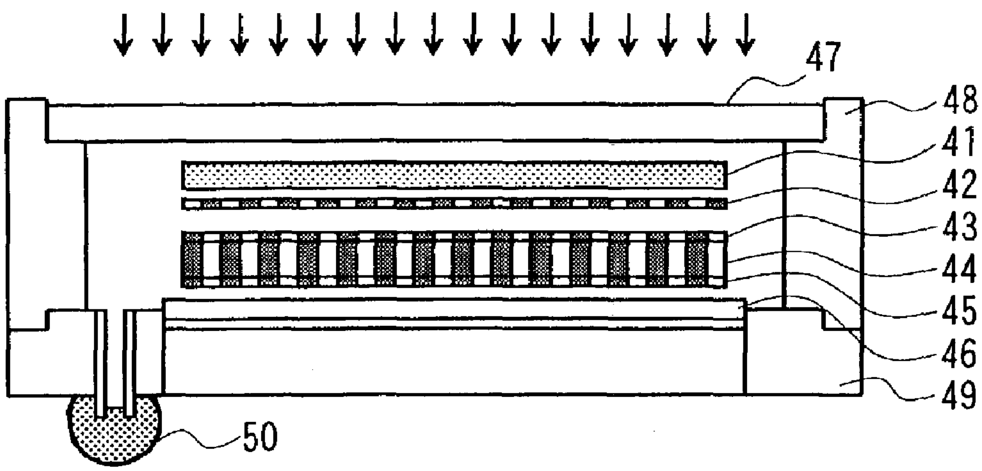

HIGHLY-SENSITIVE, PYROELECTRIC INFRARED SENSING METHOD AND APPARATUS

TECHNICAL FIELD

The present invention relates to a pyroelectric infrared sensing method and apparatus of high sensitivity.

BACKGROUND ART

In general, infrared sensors having high sensitivity are divided into a semiconductor type and a physical-property type, according to functional materials used.

Semiconductor infrared sensors formed from semiconductor materials are the most sensitive, because electron-hole pairs generated by means of energy of infrared light are extracted as an electric signal. However, since electron-hole pairs are generated by low energy, a semiconductor material having a narrow energy gap must be employed. However, when a semiconductor material having a narrow energy gap is employed, electron-hole pairs are generated even at room temperature. Therefore, such a semiconductor material produces large dark current and cannot have high sensitivity, unless it is used while being maintained at the helium temperature or the nitrogen temperature.

Further, at present, semiconductor infrared sensors are used only for astronomic observation, because they are very expensive. Further, since semiconductor infrared sensors have sensitivity only within a certain wavelength range, they have a drawback in that an infrared wavelength cannot be selected freely for high-sensitivity sensing.

A physical-property-type sensor which senses changes in a physical property of a material stemming from temperature variation thereof cannot exhibit high sensitivity unless the sensor is in the form of a thin film. However, such a physical-property-type sensor has a practical sensitivity throughout a wide wavelength range, and its most attractive feature is that the sensor can be used at room temperature, and thus, the sensor can be rendered inexpensive. Typical examples of such a physical-property-type sensor include thermistors, thermo-couples, and pyroelectric sensors.

FIG. 1 includes a graph and a diagram which show the principle of a conventional pyroelectric infrared sensor. In FIG. 1, reference numeral 101 denotes a ferroelectric element; 102 denotes a junction-type FET (JFET); 103 denotes an infrared ray; and 104 denotes a resistor Rs.

As shown in FIG. 1, the pyroelectric infrared sensor utilizes a pyroelectric coefficient, which is a temperature gradient of the spontaneous polarization value Ps of the ferroelectric element. Specifically, as shown in FIG. 1(*a*), the spontaneous polarization value Ps decreases gradually before reaching the Curie temperature Tc, but decreases at a large gradient in the vicinity of the Curie temperature Tc. When the spontaneous polarization value Ps decreases due to a variation in temperature of the ferroelectric element 101, charge become excessive accordingly. The variation in charge due to the temperature variation is called a pyroelectric coefficient. Pyroelectric infrared sensors, which are configured to extract such excessive charge as a signal, have been widely used.

In the case in which the temperature of the ferroelectric element 101 has changed from T1 to T2, the following relationships hold among electric capacitance C of the ferroelectric element 101, generated charge Q, and generated voltage V.

$$Q=\Delta Ps/\Delta T$$

$$\begin{aligned} V &= Q/C \\ &= \Delta Ps/(\Delta T\cdot C) \\ &= \Delta Ps/[(T1-T2)\cdot C] \end{aligned}$$

A near-infrared (not greater than 2 microns) photoelectron emission surface formed of a compound semiconductor has been put into practical use. Further, there has been employed a highly sensitive semiconductor photoelectric device (photomultiplier tube) which includes such a photoelectron emission surface and a mechanism for amplifying electrons in vacuum. The semiconductor photoelectric device has a sensitivity at least 10 times that of physical-property-type sensors used in the infrared and far-infrared regions.

However, the quantum efficiency of such a photoelectron emission surface is as low as 0.05%; and there does not exist a photoelectron emission device which has sensitivity for infrared light of 2 microns or higher.

Meanwhile, pyroelectric sensors, which are of a physical-property type and can operate at room temperature, have sensitivity over the entire electromagnetic wave region. Therefore, if a low-noise amplification function can be imparted to such a pyroelectric sensor, an infrared sensor which does not depend on wavelength can be produced.

The technical trend arising in pursuit of a supersensitive infrared sensor can be understood from the case of optical sensors. Most optical sensors are wholly solid sensors formed of semiconductor materials; however, some optical sensors are of a vacuum tube type. In such a vacuum tube type, primary electrons emitted from a photoelectron emission device are caused to collide, to thereby generate secondary electrons, and this operation is repeated to thereby obtain a very high amplification gain without affecting the SIN ratio (photomultiplier tube).

However, even in such a photomultiplier tube, a photoelectric material is semiconductor, and the photoelectric material must be chosen in accordance with the desired energy gap, as in the case of infrared sensing materials. Therefore, many restrictions are imposed; e.g., the photomultiplier tube must be cooled in order to obtain high sensitivity.

An infrared photoelectric surface which has high sensitivity at room temperature cannot be formed from conventional semiconductor materials. Meanwhile, incorporating a function of emitting electrons in vacuum as a part of a sensing function is expected to bring forth considerable progress toward attaining higher sensitivity.

DISCLOSURE OF THE INVENTION

In a conventional attempt for using a ferroelectric material as a micro electron source, as is well known, electrons are emitted in vacuum through reversal of the polarization of the ferroelectric material. This merely provides a function of an electron gun, which is the same as an electron emission mechanism of a lighter which emits electrons in air by use of the piezoelectric function of a ferroelectric body.

FIG. 2 shows a conventional electron-emission-type infrared sensor in which electrons are emitted from a surface of a ferroelectric body having an emitter. FIG. 3 is a perspective view showing an example process of machining the bulk surface of the electron-emission-type infrared sensor.

In these drawings, reference numeral 201 denotes a PZT thin film having an infrared-ray incident surface; 202 denotes an insulation layer; 203 denotes an emitter; 205 denotes a gate electrode; and 206 denotes an anode electrode.

Incidence of an infrared ray causes emission of electrons from the ferroelectric body in limited cases only. For example, in the "ferroelectric-body-type photoelectric device" disclosed in Japanese Patent Application No. 11-185904, (1) an emitter is formed on the ferroelectric body; and (2) the emitter has a pointed configuration or a rough surface having a surface roughness of about 1000 Å, to thereby provide conical projections. This technique is based on the same idea as is a method of producing a micro electron source on a silicon material, and a matter of the highest priority is obtainment of a configuration which facilitates generation of an electric field of highest intensity and emission of electrons from the interior of the ferroelectric body.

Therefore, in the case of emission of electrons from a ferroelectric body as well, surface charges in the vicinity of the surface of the ferroelectric body must be collected to a single location in order to induce electron emission. Therefore, in the conventional techniques, a portion of the surface of the ferroelectric body must be machined into the shape of a sharpened protrusion. Further, even when a projection surface having a very low roughness of about 1000 Å is used, the machined surface must be maintained in such a manner that projecting portions can collectively serve as an emitter.

In view of the foregoing, an object of the present invention is to provide a highly-sensitive, pyroelectric infrared sensing method and apparatus which can detect infrared temperature with high sensitivity throughout the entire electromagnetic wave range including millimeter waves and radioactive rays.

[1] A highly-sensitive, pyroelectric infrared sensing method, characterized in that a charge which is generated at a surface of a ferroelectric body upon absorption of an external infrared ray, in accordance with a pyroelectric coefficient at the interior of the ferroelectric body, can be extracted in the form of electrons by means of an anode electric field, without being restricted to high vacuum and without processing the surface of the ferroelectric body to form an emitter, whereby infrared temperature is sensed with high sensitivity throughout the entire electromagnetic wave range ranging from millimeter waves to radioactive rays.

[2] A highly-sensitive, pyroelectric infrared sensing method as described in [1] above, characterized in that, upon incidence of an infrared ray, the ferroelectric body generates at its surface a charge corresponding to the pyroelectric coefficient; an electric field is applied to the surface in order to cause the ferroelectric body to emit electrons while using the generated charge; and the emitted electrons are detected by an electron-sensitive CCD.

[3] A highly-sensitive, pyroelectric infrared sensing method as described in [1] above, characterized in that, upon incidence of an infrared ray, the ferroelectric body generates at its surface a charge corresponding to the pyroelectric coefficient; an electric field is applied to the surface in order to cause the ferroelectric body to emit electrons while using the generated charge; and the emitted electrons are converted to a two-dimensional image by means of a fluorescent screen to thereby enable observation of the two-dimensional image.

[4] A highly-sensitive, pyroelectric infrared sensing method as described in [3] above, characterized in that, before the emitted electrons are converted to a two-dimensional image by means of the fluorescent screen, the electrons are multiplied by use of a photomultiplier tube, a multi-channel plate, or an electron-implanting-type device having a multiplying function.

[5] A highly-sensitive, pyroelectric infrared sensing method as described in [3] or [4] above, characterized in that, in lieu of the fluorescent screen, a one-dimensional or two-dimensional image device having a sensitivity to electron rays is used in order to output to the outside an electric signal corresponding to the emitted electrons.

[6] A highly-sensitive, pyroelectric infrared sensing method as described in [3] or [4] above, characterized in that, in lieu of the fluorescent screen, a simple electrode structure is provided in order to measure infrared intensity in an infrared-ray radiated area instead of a two-dimensional distribution of infrared rays.

[7] A highly-sensitive, pyroelectric infrared sensing method as described in [4] or [5] above, characterized in that the electrons emitted from the ferroelectric body are converged or diverged by use of an electronic lens function.

[8] A highly-sensitive, pyroelectric infrared sensing apparatus, characterized by comprising: a ferroelectric body placed under a pressure in a range ranging from super-high vacuum to atmospheric pressure; means for radiating an infrared ray onto the ferroelectric body to thereby cause the ferroelectric body to generate a charge in accordance with a pyroelectric coefficient of the ferroelectric body; and an anode electrode for detecting the generated charge.

[9] A highly-sensitive, pyroelectric infrared sensing apparatus, characterized by comprising: a ferroelectric body placed under a pressure in a range ranging from super-high vacuum to atmospheric pressure; means for radiating an infrared ray onto the ferroelectric body to thereby cause the ferroelectric body to generate a charge in accordance with a pyroelectric coefficient of the ferroelectric body; means for amplifying the generated charge by use of a photomultiplier tube or a multi-channel plate; and an electron-sensitive CCD for detecting the amplified charge.

[10] A highly-sensitive, pyroelectric infrared sensing apparatus, characterized by comprising: a ferroelectric body placed under a pressure in a range ranging from super-high vacuum to atmospheric pressure; means for radiating an infrared ray onto the ferroelectric body to thereby cause the ferroelectric body to generate a charge in accordance with a pyroelectric coefficient of the ferroelectric body; means for amplifying the generated charge by use of a photomultiplier tube or a multi-channel plate; and a fluorescent layer for detecting the amplified charge.

(A) Structure of an Opposite-Face Electron Converging Electrode for High-Resolution Image Sensing Although electrons corresponding to an actual temperature distribution on the surface of the ferroelectric body are emitted while their surface positions are maintained, the emitted electrons travel, along lines of force of an external electric field, toward an opposed anode electrode. However, unlike the case of a solid sensor, the anode electrode is not required to be placed directly in front of an emitter and is not required to have the same electrode area as that of the emitter. Emitted electrons can travel toward the anode electrode along a curved electric field. In an extreme case, a fine dot-like electrode may be used. Use of such an electrode raises no problem when the pyroelectric infrared sensor is used solely.

However, a distribution of emitted electrons corresponding to a temperature distribution directly represents a two-dimensional distribution of infrared rays. Therefore, when the electron distribution is used as a signal, an electron capturing electrode disposed on the opposite face plays an important role in highly accurate measurement of the two-dimensional electron distribution. Therefore, an electronic lens mechanism for focusing electrons emitted from the surface of the ferroelectric body becomes necessary.

(B) Electrons for High Resolution Sensing

Actual supersensitive two-dimensional sensing involves the following problem. Since electrons corresponding to an actual temperature distribution on the surface of the ferroelectric body are emitted while their surface positions are maintained, when the reading-side electrode is miniaturized, the number of electrons reaching the electrode decreases.

The supersensitive two-dimensional sensing can be realized by use of an electron multiplying element which is disposed at the back of the emission surface and is adapted to multiply emitted electrons. In this scheme, the sensitivity and noise of the detection apparatus at the time of extracting charges from the ferroelectric body change in accordance with the dielectric constant, electrode area, thickness, and electric capacitance of the element. However, electrons emitted from the ferroelectric body are freed from solid conditions, and when an electron multiplier tube is used, a multiplication factor of 100 to 10000 can be achieved.

Such a detection apparatus enables constitution of a supersensitive, two-dimensional infrared device. That is, electrons output from the detection apparatus are multiplied by use of a photomultiplier tube or a multi-channel plate (MCP). Alternatively, the detection apparatus is combined with an electron-implanting-type device having a multiplying function. A two-dimensional distribution of multiplied secondary electrons is observed in the form of an image by use of a fluorescent screen or is output to the outside by use of a two-dimensional device, such as a CCD or CMOS, which has a sensitivity to electron beams.

(C) Resistance to Influence of Gas

Electron emission can be effected under a pressure ranging from high vacuum to one atm.

Electron emission easily occurs under a pressure ranging from high vacuum to low vacuum. However, as in the case of a lighter which utilizes the piezoelectric effect and can produce discharge under atmospheric pressure, theoretically, electron emission can be effected even under atmospheric pressure. Since the ferroelectric body is formed not from a metal but from an oxide, the ferroelectric body hardly degrades.

(D) Impartment of Electron Conductivity to the Surface

The ferroelectric body can be monocrystalline, polycrystalline, or ceramic. The feature of the present invention resides in that the ferroelectric body emits electrons which are induced at the surface of the ferroelectric body in proportion to temperature change.

BRIEF DESCRIPTION OF THE DRAWINGS

FIG. 1 includes a graph and a diagram used for describing the principle of a conventional pyroelectric infrared sensor.

FIG. 2 includes structural views of a conventional electron-emission-type infrared sensor in which electrons are emitted from a surface of a ferroelectric body having an emitter.

FIG. 3 is a perspective view showing an example process of machining the bulk surface of the electron-emission-type infrared sensor.

FIG. 8 is a view showing a portable infrared-visible conversion vacuum tube according to a third embodiment of the present invention.

BEST MODE FOR CARRYING OUT THE INVENTION

Embodiments of the present invention will next be described with reference to the drawings.

Figure 4:
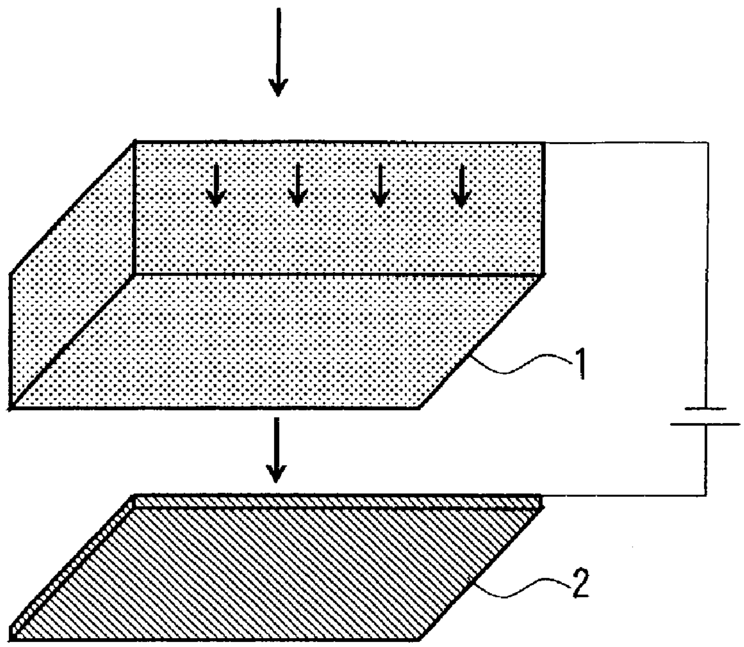
FIG. 4 is a schematic view of a supersensitive infrared sensor according to the present invention.

FIG. 4 is a schematic view of a supersensitive infrared sensor according to the present invention.

In FIG. 4, reference numeral 1 denotes a PZT thin film having an infrared-ray incident surface; and 2 denotes an anode for receiving electrons emitted from the PZT thin film.

As is apparent from FIG. 4, the supersensitive infrared sensor is an electron-emission-type infrared sensor in which electrons are emitted from the surface of a ferroelectric body having no emitter. Therefore, provision of a gate electrode at a location close to the emitter is not required.

Electrons are emitted directly from the PZT thin film 1, which serves as a ferroelectric body, in proportion to a temperature change induced by radiation of an infrared ray. Therefore, only the anode 2 is required to serve as a basic structural element. Further, designation of machining conditions of the surface of the ferroelectric body is unnecessary.

In the present invention, upon incidence of an infrared ray, an electric charge is generated at the surface of the ferroelectric body and is emitted to the outside in the form of electrons by means of a gate electrode. At this time, the higher the degree of insulation of the surface, the larger the number of electrons emitted from the surface of the ferroelectric body in accordance with the temperature distribution.

Unlike the case in which a silicon material is used, formation of an emitter is not required, and the electron emission surface may be any machined surface. The ferroelectric body may be monocrystalline, polycrystalline, or ceramics. The electron emission surface may be an as-grown surface or a mirror-finished surface. The electron emission surface may be an uneven surface (i.e., a surface having many protrusions), a tubular surface, or a composite-shape surface, which can be used without modification and do not require any special process for forming an emitter.

Formation of an emitter on the surface of a ferroelectric body as proposed in, for example, Japanese Patent Application No. 11-185904 entitled “Ferroelectric-Body-Type Photoelectric Device” is an extremely cumbersome technique. When a bulk ceramic is used, there must be added a process for machining a hard ceramic with high dimensional accuracy, as in the case of micro machining. Further, when the ferroelectric body is a thin film, it may have a flat surface, and therefore, an additional process for forming a projection(s) must be performed. The above-described processes are considerably time consuming and costly. Moreover, since a slight variation in size and position of the two-dimensionally machined emitter results in a change in electron emission density, difficulty is encountered in fabricating a two-dimensional sensing device having constant sensitivity over the entire two-dimensional surface. As described above, the emitter formation process constitutes an obstacle to putting the device into practical use.

Figure 5:
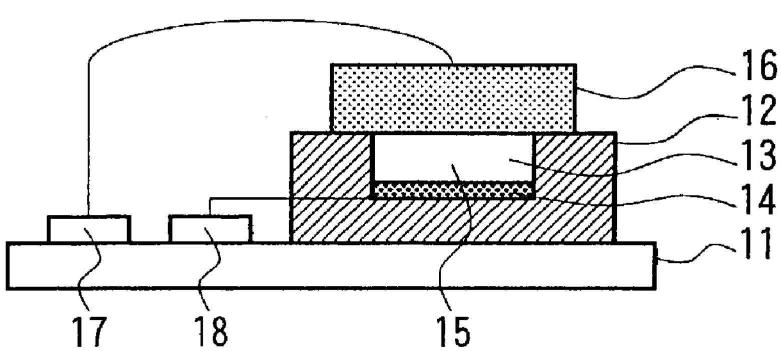
FIG. 5 is a structural view of a supersensitive infrared sensor according to a first embodiment of the present invention.

FIG. 5 is a structural view of a supersensitive infrared sensor according to a first embodiment of the present invention.

In FIG. 5, reference numeral 11 denotes a transparent glass substrate (slide glass); and 12 denotes a quartz substrate. A groove (depth: 25 μm) 15 is formed in the quartz substrate 12. A sol-gel fluorescence film 14 is formed in the groove 15. A PZT thick film 16 is formed on the quartz substrate 12, so that a clearance (15 μm) 13 is formed between the PZT thick film 16 and the sol-gel fluorescence film 14. The PZT thick film 16 is connected to an electrode 17. The sol-gel fluorescence film 14 is connected to an electrode 18.

As shown in FIG. 5, a space of 5 to 25 μm must be provided, because a DC voltage of 1000 V (maximum) is previously applied to the interface of a ferroelectric body; i.e., PZT ceramic. In order to enable disposal of the device in a vacuum space while maintaining the small clearance, the PZT thick film 16 and the quartz substrate 12 are integrated in a small unit, which is then placed in the vacuum space. For enabling the above, micro machining is performed in order to provide a micro gap in the quartz substrate 12. Specifically, a gap of 5 to 25 μm is formed in the quartz substrate 12 through etching; and an aluminum electrode is formed on the bottom surface of the groove to be used as an anode. Further, a zinc-sulfide containing fluorescence material sensitive to low-energy electron beams is formed on the electrode by a sol-gel process.

Figure 6:
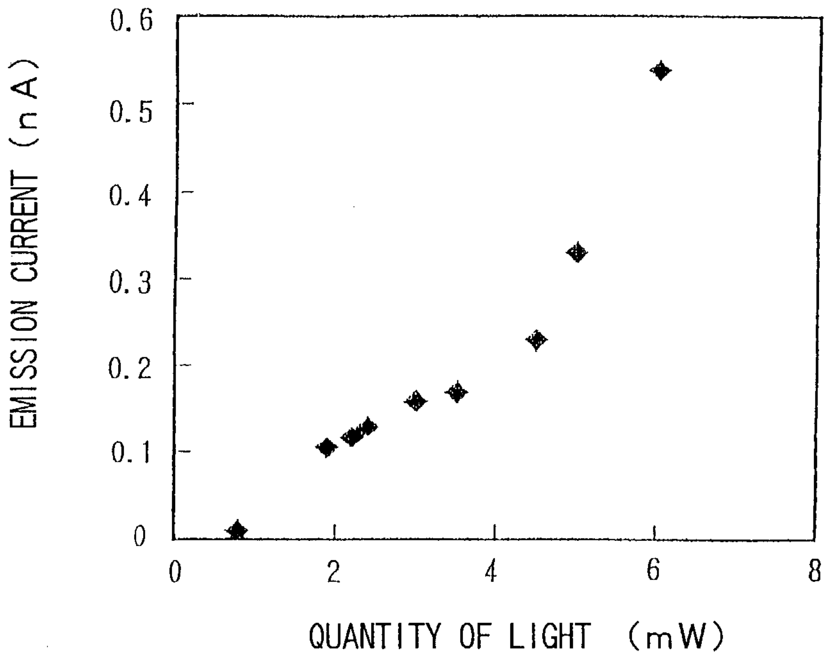
FIG. 6 is a graph showing the relation between quantity of incident infrared rays and electron emission current in the supersensitive infrared sensor according to the first embodiment of the present invention.

The relation between quantity of incident infrared rays and electron emission current in the supersensitive infrared sensor fabricated in the present embodiment is shown in FIG. 6.

FIG. 6 is a graph showing the relation between quantity of incident infrared rays and electron emission current in the supersensitive infrared sensor according to the first embodiment of the present invention. The vertical axis represents emission current (nA); and the horizontal axis represents quantity of light (mW).

In the case of a single-type supersensitive infrared sensor, a light reception surface is adapted for single sensing, and a single anode electrode is provided in combination with an electron multiplier tube.

In the case in which two-dimensional sensing is unnecessary, a single light reception surface and a single anode electrode are provided. When the infrared sensor is of a supersensitive type, it is combined with an electron multiplier device, which will be described later.

Next, a second embodiment of the present invention will be described.

The present embodiment can be applied to a high-resolution, two-dimensional infrared camera, and to an infrared camera for measuring two-dimensional distribution of infrared rays.

In order to achieve high sensitivity in two-dimensional sensing, an electron multiplier device is provided on the electron-emission side of the ferroelectric body. Examples of the electron multiplier device include a photoelectron multiplier tube and an MPC.

Figure 7:
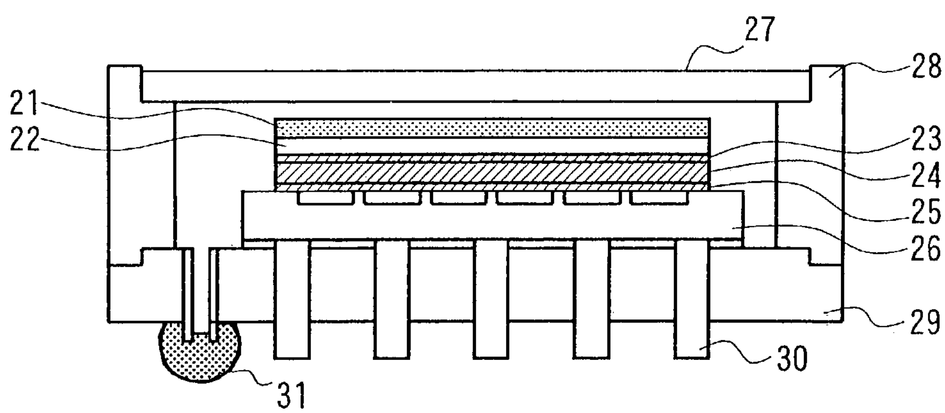
FIG. 7 is a structural view of a high-resolution, two-dimensional infrared camera according to a second embodiment of the present invention in which an MCP is incorporated.
Figure 7:
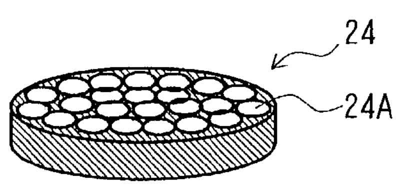

FIG. 7 is a structural view of a high-resolution, two-dimensional infrared camera according to a second embodiment of the present invention in which an MCP is incorporated. FIG. 7(*a*) is a sectional view of the high-resolution, two-dimensional infrared camera; and FIG. 7(*a*) is a perspective view of the incorporated MCP.

In FIG. 7, reference numeral 21 denotes a PZT thin film; 22 denotes a spacer; 23 and 25 each denote a conductive layer; 24 denotes an MCP; 26 denotes an electron-sensitive CCD; 27 denotes an infrared-ray transmission window; 28 denotes a vacuum package; 29 denotes a stem; 30 denotes output pins; and 31 denotes a vacuum seal.

As shown in FIG. 7(*b*), the MCP 24 has many fine holes 24A arranged two-dimensionally or consists of a bundle of fine tubes arranged two-dimensionally. The MCP 24 has a structure such that secondary elections are easily generated at the side walls of the fine holes 24A. Upon application of a positive electric field, electrons emitted from the PZT thin film 21, which is a ferroelectric body, travel toward first ends of the fine holes 24A located at one end face of the of the MPC 24. The electrons are multiplied at the side walls of the fine holes 24A by a factor of 1 million to 100 million. Thus, secondary electrons are emitted at second ends of the fine holes 24A located at the opposite end face of the MPC 24. The secondary electrons are measured by means of the electron-sensitive CCD 26.

Notably, in lieu of the electron-sensitive CCD 26, a PD, an avalanche PD, or a like detector may be combined with the MCP 24. In lieu of the CCD, a CMOS-type detector may be used.

Next, a third embodiment of the present invention will be described.

The present embodiment can be applied to a portable infrared viewer and an infrared television.

The camera shown in FIG. 7 is designed to be built in an image system such as a television. However, rather than a semiconductor device being disposed at the final stage, a fluorescent screen may be disposed at the final stage. In this case, emitted electrons are passed through an electron multiplying device so as to obtain multiplied electrons as secondary electrons, which are radiated onto the fluorescent screen. This enables visual observation of an image on the fluorescent screen.

FIG. 8 is a view showing a portable infrared-visible conversion vacuum tube according to a third embodiment of the present invention.

In FIG. 8, reference numeral 41 denotes a PZT thin film; 42 denotes an electron passing mesh electrode; 43 and 45 each denote a conductive layer; 44 denotes an MCP; 46 denotes a fluorescent screen; 47 denotes an infrared-ray transmission window; 48 denotes a vacuum package; 49 denotes a stem; 50 denotes a vacuum seal.

Observation of infrared images has been put into practical use in military applications using the near-infrared region. However, observation of infrared images has not been practiced in the infrared and far-infrared regions. The device of the present invention enables realization of such observation.

The present invention is not limited to the above-described embodiments. Numerous modifications and variations of the present invention are possible in light of the spirit of the present invention, and they are not excluded from the scope of the present invention.

As has been described in detail, the present invention achieves the following effects.

(A) A charge which is generated at the surface of a ferroelectric body, upon absorption of an external infrared ray, in accordance with the pyroelectric coefficient can be extracted in the form of electrons by means of an anode electric field, without being restricted to high vacuum and without processing the surface of the ferroelectric body to form an emitter. Thus, infrared temperature can be sensed with high sensitivity throughout the entire electromagnetic wave range ranging from millimeter waves to radioactive rays.

(B) When the detection apparatus of the present invention is used for two-dimensional sensing of high sensitivity, an electron multiplying element for multiplying emitted electrons is disposed at the back of the emission surface of the detection apparatus. In this scheme, the sensitivity and noise of the detection apparatus at the time of extracting charges from the ferroelectric body change depending on the dielectric constant, electrode area, thickness, and electric capacitance of the element. However, electrons emitted from the ferroelectric body are freed from solid conditions, and when an electron multiplier tube is used, a multiplication factor of 100 to 10000 can be achieved.

Such a detection apparatus enables constitution of a supersensitive, two-dimensional infrared device. That is, electrons output from the detection apparatus are multiplied by use of a photomultiplier tube or a multi-channel plate (MCP). Alternatively, the detection apparatus is combined with an electron-implanting-type device having a multiplying function. A two-dimensional distribution of multiplied secondary electrons is observed in the form of an image by use of a fluorescent screen or output to the outside by use of a two-dimensional device, such as a CCD or CMOS, which has sensitivity to electron beams.

Social needs for high-sensitivity infrared image sensors will be described briefly. Infrared rays have the following characteristics.

(1) Temperature sensing: Infrared light enables high-sensitivity temperature sensing over a wide temperature range from low temperature to high temperature, and such temperature sensing can be used in relation to environmental protection and energy conservation. Accordingly, infrared light enables proper performance of temperature sensing in the fields of energy, environment, and transportation.

(2) Human sensing: Infrared light enables proper performance of temperature sensing in the fields of medical science, transportation, housing, and education.

(3) Substance sensing: Infrared light has a function for specifying (identifying) a substance such as a molecule or organic matter.

The supersensitive, pyroelectric infrared detection apparatus of the present invention can be suitably applied to, for example, supersensitive infrared sensors, infrared cameras for measuring two-dimensional distribution in the infrared region, and portable infrared viewers.

INDUSTRIAL APPLICABILITY

The supersensitive, pyroelectric infrared detection apparatus of the present invention can be suitably applied to, for example, supersensitive infrared sensors, infrared cameras for measuring two-dimensional distribution in the infrared region, and portable infrared viewers.

The invention claimed is:

1. A pyroelectric infrared sensing method, comprising: generating a charge in a ferroelectric body upon absorption of an external infrared ray incident on a front surface;

extracting the charge in accordance with a pyroelectric coefficient at an interior of the ferroelectric body in a form of electrons by an electric field generation element, said electric field generation element consisting of an anode electrode provided solely to said ferroelectric body, without being restricted to high vacuum and without processing a reverse surface opposite the front surface of the ferroelectric body to form an emitter or a gate electrode or both; and detecting the electrons emitted from the ferroelectric body.

2. The method according to claim 1, further comprising: detecting the emitted electrons by an electron-sensitive CCD.

3. The method according to claim 1, further comprising: converting the emitted electrons to a two-dimensional image by a fluorescent screen to thereby enable observation of the two-dimensional image.

4. The method according to claim 3, further comprising: multiplying the emitted electrons, before the emitted electrons are converted to a two-dimensional image by the fluorescent screen, by use of a photomultiplier tube, a multi-channel plate, or an electron-implanting-type device having a multiplying function.

5. The method according to claim 4, further comprising: utilizing a one-dimensional or two-dimensional image device having a sensitivity to electron rays to externally output an electric signal corresponding to the emitted electrons.

6. The method according to claim 5, further comprising: utilizing an electronic lens to converge or diverge the electrons emitted from the ferroelectric body.

7. The method according to claim 4, further comprising: utilizing a simple electrode structure to measure infrared intensity in an infrared-ray radiated area instead of a two-dimensional distribution of infrared rays.

8. The method according to claim 4, further comprising: utilizing an electronic lens to converge or diverge the electrons emitted from the ferroelectric body.

9. The method according to claim 3, further comprising: utilizing a one-dimensional or two-dimensional image device having a sensitivity to electron rays to externally output an electric signal corresponding to the emitted electrons.

10. The method according to claim 3, further comprising: utilizing a simple electrode structure to measure infrared intensity in an infrared-ray radiated area instead of a two-dimensional distribution of infrared rays.

11. The method according to claim 9, further comprising: utilizing an electronic lens to converge or diverge the electrons emitted from the ferroelectric body.

12. A pyroelectric infrared sensing apparatus, comprising:

a ferroelectric body placed under a pressure in a range ranging from super-high vacuum to atmospheric pressure;

a radiation mechanism configured to radiate an infrared ray onto a front surface of the ferroelectric body to thereby cause the ferroelectric body to generate a charge in accordance with a pyroelectric coefficient of the ferroelectric body; and an electric field generation element consisting of an anode electrode provided solely to said ferroelectric body, without provision of an emitter or a gate electrode or both on a reverse surface of the ferroelectric body opposite the front surface, to detect the generated charge.

13. A pyroelectric infrared sensing apparatus, comprising:

a ferroelectric body placed under a pressure in a range ranging from super-high vacuum to atmospheric pressure;

a radiation mechanism configured to radiate an infrared ray onto a front surface of the ferroelectric body to thereby cause the ferroelectric body to generate a charge in accordance with a pyroelectric coefficient of the ferroelectric body;

an amplification mechanism including an electric field generation element consisting of an anode provided solely to said ferroelectric body, configured to amplify the generated charge by use of a photomultiplier tube or a multi-channel plate, without provision of an emitter or a gate electrode or both on a reverse surface of the ferroelectric body opposite the front surface; and an electron-sensitive CCD configured to detect the amplified charge.

14. A pyroelectric infrared sensing apparatus, comprising:

a ferroelectric body placed under a pressure in a range ranging from super-high vacuum to atmospheric pressure;

a radiation mechanism configured to radiate an infrared ray onto a front surface of the ferroelectric body to thereby cause the ferroelectric body to generate a charge in accordance with a pyroelectric coefficient of the ferroelectric body;

an amplification mechanism including an electric field generation element consisting of an anode provided solely to said ferroelectric body, configured to amplify the generated charge by use of a photomultiplier tube or a multi-channel plate, without provision of an emitter or a gate electrode or both on a reverse surface of the ferroelectric body opposite the front surface; and a fluorescent layer configured to detect the amplified charge.

* * * * *